(12) United States Patent
Kanno

(10) Patent No.: US 10,473,481 B2
(45) Date of Patent: Nov. 12, 2019

(54) LANE DISPLAY DEVICE AND LANE DISPLAY METHOD

(71) Applicant: Nissan Motor Co., Ltd., Yokohama-shi, Kanagawa (JP)

(72) Inventor: Hideyuki Kanno, Kanagawa (JP)

(73) Assignee: Nissan Motor Co., Ltd., Yokohama-shi, Kanagawa (JP)

(*) Notice: Subject to any disclaimer, the term of this patent is extended or adjusted under 35 U.S.C. 154(b) by 0 days.

(21) Appl. No.: 15/747,391

(22) PCT Filed: Jul. 27, 2015

(86) PCT No.: PCT/JP2015/071234
§ 371 (c)(1),
(2) Date: Jan. 24, 2018

(87) PCT Pub. No.: WO2017/017759
PCT Pub. Date: Feb. 2, 2017

(65) Prior Publication Data
US 2018/0216955 A1 Aug. 2, 2018

(51) Int. Cl.
*G01C 21/34* (2006.01)
*G01C 21/36* (2006.01)
*G08G 1/0969* (2006.01)

(52) U.S. Cl.
CPC ..... *G01C 21/3658* (2013.01); *G01C 21/3492* (2013.01); *G01C 21/3694* (2013.01); *G08G 1/0969* (2013.01)

(58) Field of Classification Search
CPC ............ G01C 21/3492; G01C 21/3658; G01C 21/3694; G08G 1/0959
See application file for complete search history.

(56) References Cited

U.S. PATENT DOCUMENTS

| 7,860,639 | B2 * | 12/2010 | Yang | ...................... G08G 1/081 340/901 |
| 8,036,823 | B2 | 10/2011 | Akita et al. | |
| 8,060,303 | B2 * | 11/2011 | Bando | ...................... G01C 21/36 340/995.1 |
| 8,234,064 | B2 | 7/2012 | Oonishi et al. | |
| 8,384,532 | B2 * | 2/2013 | Szczerba | ............... G01S 13/723 340/435 |
| 2006/0155427 | A1 * | 7/2006 | Yang | ........................ G08G 1/07 701/1 |
| 2007/0106460 | A1 * | 5/2007 | Nakayama | ......... G01C 21/3655 701/533 |
| 2008/0036626 | A1 | 2/2008 | Kim | |
| 2010/0153000 | A1 | 6/2010 | Akita et al. | |

(Continued)

FOREIGN PATENT DOCUMENTS

| CN | 1959347 A | 5/2007 |
| CN | 101297177 A | 10/2008 |

(Continued)

*Primary Examiner* — Robert T Nguyen
(74) *Attorney, Agent, or Firm* — Young Basile Hanlon & MacFarlane, P.C.

(57) ABSTRACT

A lane display device acquires traffic information indicating a certain section for each of lanes and displays the certain section in the lane in which a vehicle travels and a transition region indicating transition with respect to the certain section near at least one of a start point or an end point of the certain section.

11 Claims, 6 Drawing Sheets

(56) References Cited

U.S. PATENT DOCUMENTS

| | | | |
|---|---|---|---|
| 2010/0223002 A1 | 9/2010 | Oonichi et al. | |
| 2011/0109475 A1* | 5/2011 | Basnayake | G08G 1/096716 340/902 |
| 2011/0319099 A1* | 12/2011 | Beuk | G01C 21/3694 455/456.3 |
| 2013/0282264 A1* | 10/2013 | Bastiaensen | G01C 21/3492 701/119 |
| 2014/0163878 A1 | 6/2014 | Asano | |
| 2015/0241239 A1* | 8/2015 | van Dok | G01C 21/3664 701/538 |
| 2016/0059775 A1* | 3/2016 | Gorse | G01S 19/13 701/468 |
| 2016/0123761 A1* | 5/2016 | Van Wieringen | G01C 21/3697 701/465 |

FOREIGN PATENT DOCUMENTS

| | | | |
|---|---|---|---|
| CN | 102063798 A | 5/2011 |
| JP | 2001108459 A | 4/2001 |
| JP | 2002250635 A | 9/2002 |
| JP | 2007127419 A | 5/2007 |
| JP | 2007148901 A | 6/2007 |
| JP | 2007178358 A | 7/2007 |
| JP | 2008058028 A | 3/2008 |
| JP | 2013130464 A | 7/2013 |
| JP | 2014115231 A | 6/2014 |
| JP | 2015025705 A | 2/2015 |
| JP | 2015075479 A | 4/2015 |
| JP | 2016139204 A | 8/2016 |
| RU | 2400710 C1 | 9/2010 |

* cited by examiner

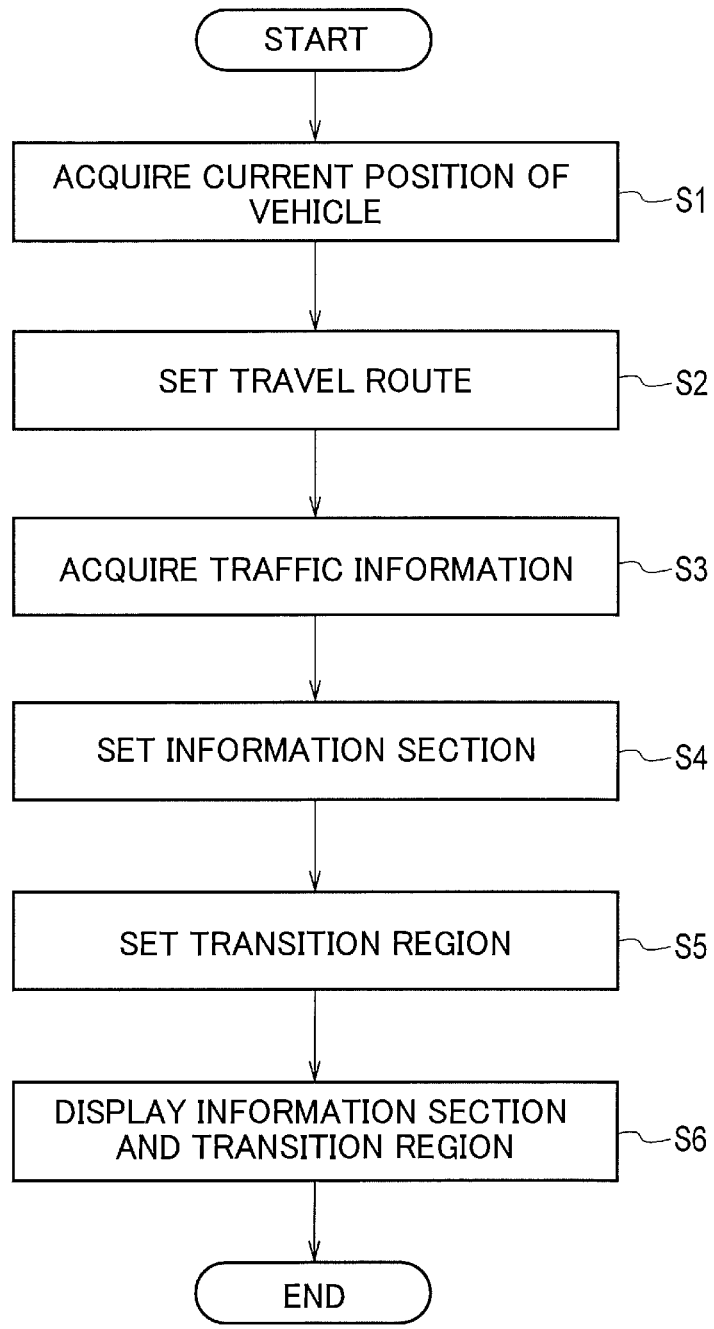

LANE DISPLAY DEVICE AND LANE DISPLAY METHOD

TECHNICAL FIELD

The present invention relates a lane display device and a lane display method which display a certain section for each lane.

BACKGROUND

There is known a technique in which a device configured to provide guidance of a route to a set destination displays a traffic jam section or the like in red or other colors on a road in a map (see Japanese Patent Application Publication No. 2015-25705). A driver can thereby easily recognize an avoidance recommended section or a travel recommended section and select an appropriate route.

However, in the case of displaying a road including multiple lanes to present sections such as traffic jam sections in the respective lanes, for example, the technique described in Japanese Patent Application Publication No. 2015-25705 displays a start point or an end point of each of the sections without giving any advance notice. Accordingly, the driver may be confused at a point where the number of lanes in which the sections are displayed increases or decreases.

SUMMARY

In view of the problem described above, an object of the present invention is to provide a lane display device and a lane display method which can reduce confusion of a driver.

A lane display device acquires traffic information of a certain section for each of lanes, displays the certain section in the lane in which a vehicle travels depending on a position of the vehicle, and displays a transition region indicating transition with respect to the certain section near at least one of a start point or an end point of the certain section such that a pattern of the transition region changes more toward the at least one of the start point or the end point.

The present invention can provide the lane display device and the lane display method which can reduce confusion of a driver by displaying the region indicating the transition from or to the section of the lane.

BRIEF DESCRIPTION OF THE DRAWINGS

FIG. 6 is a flowchart explaining a lane display method by the lane display device according to the embodiment of the present invention;

DETAILED DESCRIPTION OF THE EMBODIMENTS

Figure 1:
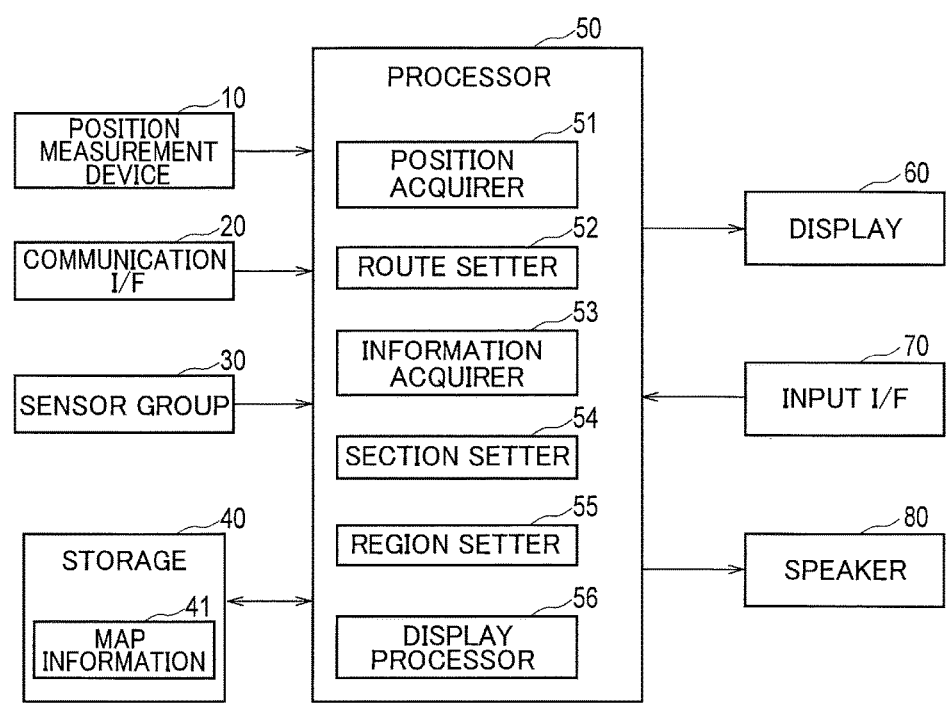
FIG. 1 is a block diagram explaining an example of a configuration of a lane display device according to an embodiment of the present invention.

An embodiment of the present invention is described with reference to the drawings. In the description of the drawings, the same or similar parts are denoted by the same or similar reference numerals and overlapping description is omitted.

(Lane Display Device)

As illustrated in FIG. 1, a lane display device according to the embodiment includes a position measurement device 10, a communication interface (I/F) 20, a sensor group 30, a storage 40, a processor 50, a display 60, an input I/F 70, and a speaker 80. The lane display device according to the embodiment of the present invention is, for example, mounted on a vehicle V and searches for travel routes based on lanes.

The position measurement device 10 measures a current position by using a positioning system such as a global positioning system (GPS). The position measurement device 10 includes, for example, a GPS receiver. The position measurement device 10 outputs the measured current position to the processor 50 time after time.

The communication I/F 20 is, for example, a communication unit which wirelessly exchanges signals with outside. The communication I/F 20 can receive, for example, traffic information on each of various lanes from the outside by using an intelligent transport system (ITS) which sends traffic information such as traffic jam information, traffic control information, and warning information, weather information, and the like in real time. The ITS include VICS (Vehicle Information and Communication System: registered trademark), telematics, and the like. The communication I/F 20 outputs the received information to the processor 50 time after time.

The sensor group 30 can be configured by a speed sensor, an acceleration sensor, an angular speed sensor, a steering angle sensor, and the like. The sensor group 30 detects the speed of the vehicle V, the three-axis acceleration and angular speed of the vehicle V in a three-dimensional Cartesian coordinate system, and the like by using the sensors, and outputs the detection results to the processor 50 time after time. The sensor group 30 may include an image sensor which captures an image around the vehicle V, a distance sensor such as a laser range finder (LRF) which detects the distance from the vehicle V to a target and the direction in which the target is present, a bearing sensor which detects the bearing of the vehicle V, and the like.

The storage 40 stores map information 41 including lanes in each road. The storage 40 can be configured by a semiconductor memory, a magnetic disk, or the like. The storage 40 may include information on features present around the roads. The storage 40 may also store programs necessary for processing performed by the processor 50. The storage 40 may be configured by one piece of hardware or by multiple pieces of hardware.

The processor 50 includes a position acquirer 51, a route setter 52, an information acquirer 53, a section setter 54, a region setter 55, and a display processor 56. The processor 50 can be configured by, for example, a microcontroller which is an integrated circuit including a central processing unit (CPU), a memory, an input/output I/F, and the like. In this case, the multiple information processors (51 to 56) configuring the processor 50 are implemented by the CPU executing a computer program installed in advance in the microcontroller. Parts configuring the processor 50 may be configured by an integral piece of hardware or separate pieces of hardware. The microcontroller may serve also as, for example, an electronic control unit (ECU) used for other control associated with the vehicle V such as automatic driving control.

The display 60 displays images and characters according to control by the processor 50 to present various pieces of information to an occupant of the vehicle V. The display 60 is formed of, for example, a display such as a liquid-crystal display. The display 60 displays a map of an area around the vehicle V which includes roads recorded in the map information 41 and lanes in each road, according to the control of the processor 50.

The input I/F 70, for example, receives operations performed by the occupant and outputs signals corresponding to the operations to the processor 50. The operations performed on the input I/F 70 may be performed by voice. The display 60 and the input I/F 70 may be integrally formed as a touch panel display. The speaker 80 regenerates voices and sounds according to the control by the processor 50 to present various pieces of information to the occupant of vehicle V.

The position acquirer 51 acquires the current position of the vehicle V in the map information 41 based on the current position which is measured by the position measurement device 10 and on the movement amount of the vehicle V and the position of the vehicle V relative to the features which are detected by the sensor group 30.

The route setter 52 sets, for example, a travel route from the current position acquired by the position acquirer 51 to a destination which is set based on the operation performed by the occupant on the input I/F 70 or the like and which is to be reached by the vehicle V, in the map information 41.

The information acquirer 53 acquires at least the traffic information on each of lanes associated with the route along which the vehicle V travels, from the communication I/F 20. The traffic information on each lane is, for example, the traffic jam information indicating a section of traffic jam or congestion, the traffic control information indicating a section of traffic control, information indicating an accident black spot, and the like. Moreover, the information acquirer 53 acquires, as the traffic information, guide information indicating a section where the vehicle V should travel and a section for avoiding the traffic jam section or the traffic control section, based on the travel route set by the route setter 52. The information acquirer 53 may acquire the traffic information for each lane recorded in advance from the map information 41 or acquire the traffic information for each lane around the vehicle V.

The section setter 54 sets the section indicated by the traffic information acquired by the information acquirer 53, at least for the lane in the map information 41 in which the vehicle V is traveling, as an information section in which certain information is to be notified to a driver of the vehicle V. The information section includes at least one of a travel recommended section which is indicated by the guide information and in which the vehicle V is recommended to travel and an avoidance recommended section which is indicated by the traffic jam information, the traffic control information, the information indicating the accident black spot, and the like and which is recommended to be avoided.

The region setter 55 sets a transition region indicating transition from or to the information section set by the section setter 54, near at least one of a start point and an end point of the information section. The transition region is a region with a certain length along the direction of the lane.

The display processor 56 displays, on the display 60, at least the lane in the map information 41 in which the vehicle V travels, the information section set by the section setter 54, and the transition region set for the information section, depending on the current position of the vehicle V.

Figures 2A, 2B, 2C:
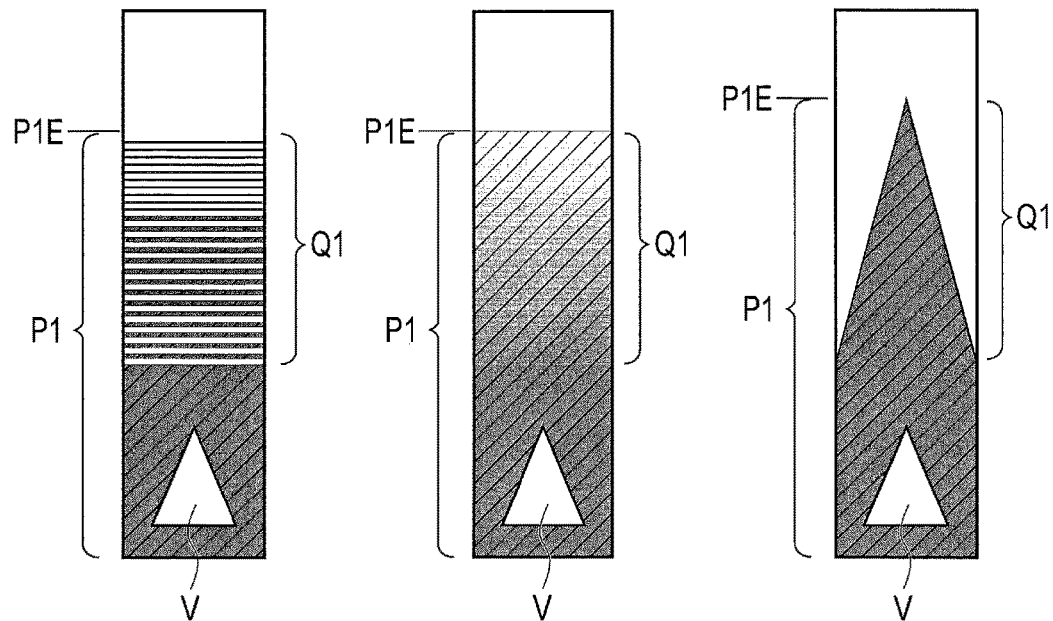
FIGS. 2A-2C are each an example illustrating a transition region set for a travel recommended section.

For example, as illustrated in FIGS. 2A-2C, the display 60 displays a travel recommended section P1 set for the lane in which the vehicle V travels and a transition region Q1 near an end point P1E of the travel recommended section P1, according to the control by the display processor 56. White triangles each indicate the current position of the vehicle V. For example, the display 60 displays an image such that the upper side thereof corresponds to the front side of the vehicle V and the image scrolls down when the vehicle V travels forward.

The travel recommended section P1 excluding the transition region Q1 is displayed in a cool color such as, for example, green so that the occupant can intuitively recognize the travel recommended section P1 (see hatching by lines extending toward the upper right). In the example illustrated in FIG. 2A, the transition region Q1 is displayed such that the pattern thereof changes from dense to sparse in a direction from the travel recommended section P1 toward a different section. In the example illustrated in FIG. 2B, the transition region Q1 is displayed such that the color thereof becomes closer to the color of the different section in the direction from the travel recommended section P1 toward the different section. In the example illustrated in FIG. 2C, the transition region Q1 is displayed such that the width thereof becomes smaller in the direction from the travel recommended section P1 toward the different section. As described above, the transition region Q1 is displayed such that the pattern thereof changes more in the direction from the travel recommended section P1 toward the different section, and this can reduce the driver's feeling of strangeness due to display of the end point of the section without giving any advance notice.

In the examples illustrated in FIGS. 2A-2C, the display 60 displays the transition region Q1 such that the end point of the transition region Q1 matches the end point P1E of the travel recommended section P1. The display 60 can thereby notify the driver that the vehicle V is approaching the end point P1E in advance without giving the feeling of strangeness.

Figures 3A, 3B:
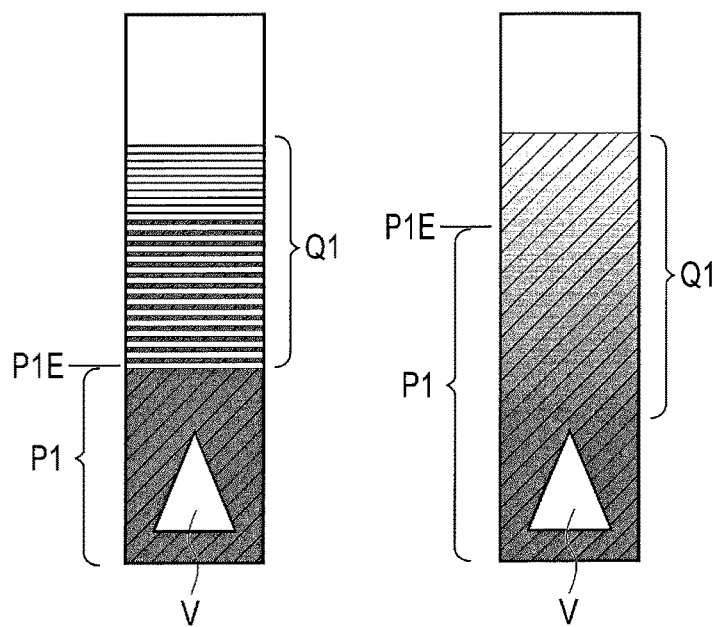
FIGS. 3A and 3B are each a view explaining another example of the transition region set for the travel recommended section.

Moreover, as illustrated in FIG. 3A, the display 60 may display the transition region Q1 such that the start point of the transition region Q1 matches the end point P1E of the travel recommended section P1. Alternatively, the display 60 may display the transition region Q1 such that the end point P1E of the travel recommended section P1 is located in the transition region Q1. Furthermore, the transition region Q1 may be displayed at a position short of the end point P1E of the travel recommended section P1.

Figure 4A:
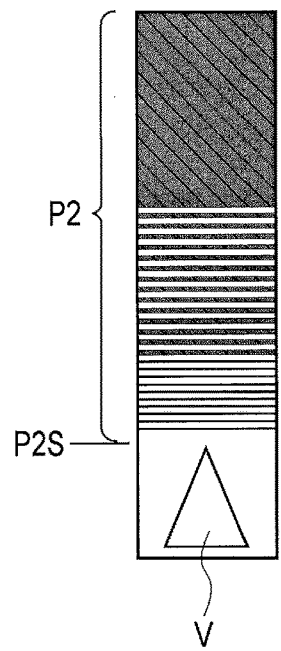
FIGS. 4A-4C are each an example illustrating a transition region set for an avoidance recommended section.
Figure 4B:
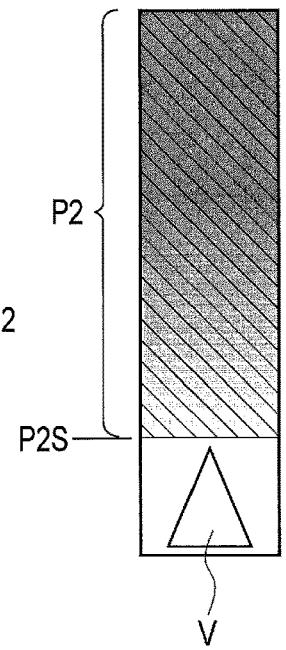
Figure 4C:
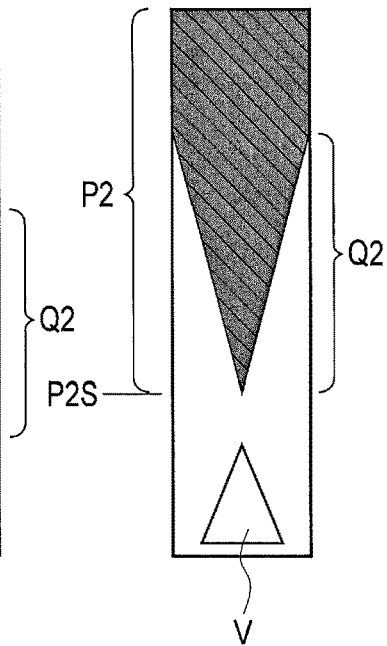

For example, as illustrated in FIGS. 4A-4C, the display 60 displays an avoidance recommended section P2 set for the lane in which the vehicle V travels and a transition region Q2 near a start point P2S of the avoidance recommended section P2, according to the control by the display processor 56.

The avoidance recommended section P2 excluding the transition region Q2 is displayed in a warm color such as, for example, red so that the occupant can intuitively recognize the avoidance recommended section P2 (see hatching by lines extending toward the upper left). In the example illustrated in FIG. 4A, the transition region Q2 is displayed such that the pattern thereof changes from sparse to dense in a direction from a different section toward the avoidance recommended section P2. In the example illustrated in FIG. 4B, the transition region Q2 is displayed such that the color thereof changes from the color of the different section to the color of the avoidance recommended section P2 in the direction from the different section toward the avoidance recommended section P2. In the example illustrated in FIG. 4C, the transition region Q2 is displayed such that the width thereof becomes larger in the direction from the different section toward the avoidance recommended section P2. As described above, the transition region Q2 is displayed such that the pattern thereof changes more in the direction from the different section toward the avoidance recommended section P2, and this can reduce the driver's feeling of strangeness due to display of the start point of the section without giving any advance notice.

Figure 5A:
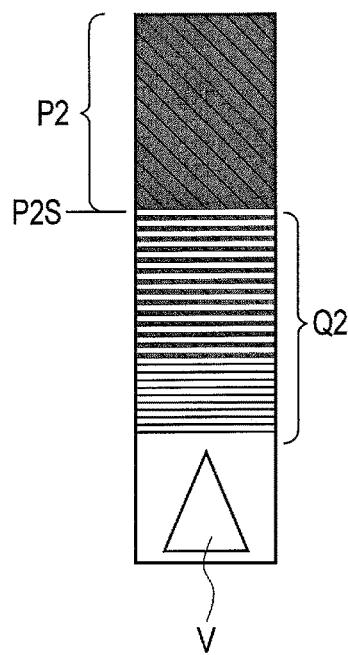
FIGS. 5A and 5B are each a view explaining another example of the transition region set for the avoidance recommended section.
Figure 5B:
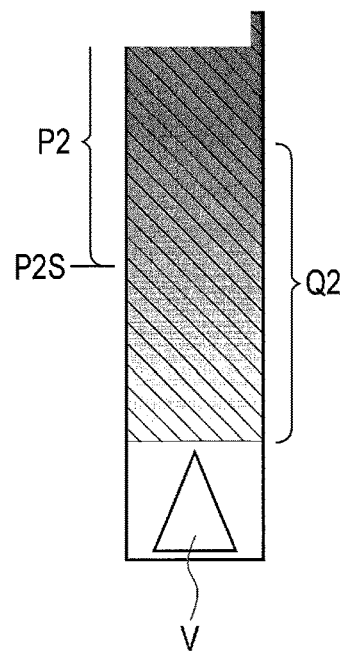

In the examples illustrated in FIGS. 4A-4C, description is given of the case where the start point of the transition region Q2 matches the start point P2S of the avoidance recommended section P2. However, the transition region Q2 may be displayed at a different position. For example, as illustrated in FIG. 5A, the display 60 may display the transition region Q2 such that the end point of the transition region Q2 matches the start point P2S of the avoidance recommended section P2. Alternatively, the display 60 may display the transition region Q2 such that the start point P2S of the avoidance recommended section P2 is located in the transition region Q2. Furthermore, the transition region Q2 may be displayed at a position short of the start point P2S of the avoidance recommended section P2. The display 60 can thereby notify the driver that the vehicle V is approaching the start point P2S in advance without giving the feeling of strangeness.

(Lane Display Method)

An example of operations of the lane display device according to the embodiment is described with reference to the flowchart of FIG. 6.

In step S1, the position acquirer 51 acquires the current position of the vehicle V in the map information 41, based on the current position which is measured by the position measurement device 10 and on the movement amount of the vehicle V and the position of the vehicle V relative to the features which are detected by the sensor group 30.

In step S2, the route setter 52 searches for a route extending from the current position acquired by the position acquirer 51 to the destination of the vehicle V set by using the input I/F 70 in the map information 41, and sets this route as the travel route.

In step S3, the information acquirer 53 acquires the traffic information on each lane of the road on which the vehicle V travels, from the communication I/F 20, the map information 41, and the like.

In step S4, the section setter 54 sets a section indicated by the traffic information acquired by the information acquirer 53, for each lane of the road on which the vehicle V travels, as the information section in which certain information is to be notified to the driver of the vehicle V.

In step S5, the region setter 55 sets the transition region indicating the transition from or to the information section set by the section setter 54, near at least one of the start point and the end point of the information section.

In step S6, the display processor 56 displays, on the display 60, the road n which the vehicle V travels, the information section set by the section setter 54, and the transition region set by the region setter 55, depending on the current position of the vehicle V.

As described above, the lane display device according to the embodiment of the present invention displays the transition region to allow the driver to recognize the transition at at least one of the start point and the end point of the certain section of the lane. Accordingly, the lane display device can reduce confusion of the driver caused by displaying of the start point or the end point of the section without giving any advance notice.

Moreover, the lane display device according to the embodiment of the present invention displays the transition region near the end point of the travel recommended section and can thereby notify the driver that the lane in which the vehicle V travels will not be the travel recommended lane anymore, in advance without giving the feeling of strangeness.

Furthermore, the lane display device according to the embodiment of the present invention displays the transition region near the start point of the avoidance recommended section and can thereby notify the driver that the lane in which the vehicle V travels will be the avoidance recommended lane, in advance without giving the feeling of strangeness.

(First Modified Example)

Figure 7:
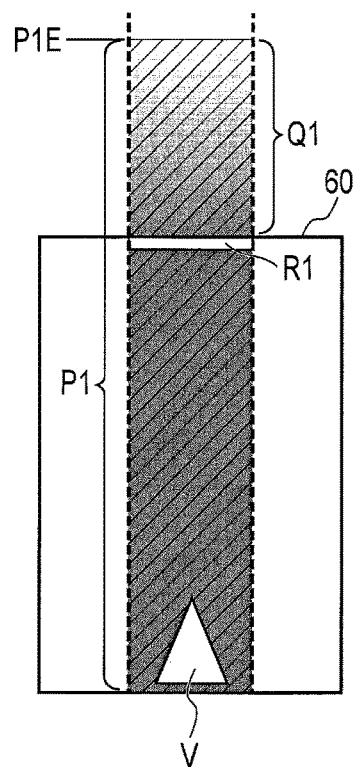
FIG. 7 is a view explaining an operation of a lane display device according to a first modified example of the embodiment of the present invention.

A lane display device according to a first modified example of the embodiment of the present invention is different from that in the aforementioned embodiment in that, as illustrated in FIG. 7, the display 60 displays an advance notice bar R1 notifying the driver that the current position of the vehicle V in the map information 41 is approaching the end point P1E of the travel recommended section P1.

Specifically, the processor 50 functions as a notifying unit configured to notify the driver that the vehicle V is approaching the end point P1E when the vehicle V is approaching the end point P1E in the map information 41. When the distance to the end point P1E reaches or falls below a predetermined threshold, the processor 50 displays the advance notice bar R1 blinking at a certain cycle on the display 60. The blinking cycle of the advance notice bar R1 becomes shorter as the vehicle V approaches the end point P1E, and the display of the advance notice bar R1 is stopped when the current position of the vehicle V moves outside the travel recommended section P1. In the example illustrated in FIG. 7, the advance notice bar R1 is displayed at an upper end of the display 60 and this indicates that the transition region Q1 and the end point P1E are not displayed yet on the display 60.

Figure 8:
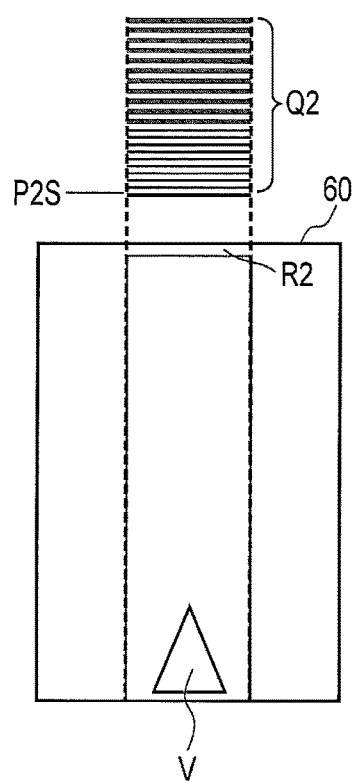
FIG. 8 is a view explaining an operation of the lane display device according to the first modified example of the embodiment of the present invention.

Similarly, as illustrated in FIG. 8, the processor 50 may display an advance notice bar R2 notifying the driver that the vehicle V is approaching the start point P2S of the avoidance recommended section P2, on the display 60. Specifically, the processor 50 functions as a notifying unit configured to notify the driver that the vehicle V is approaching the start point P2S when the vehicle V approaches the start point P2S in the map information 41. When the distance to the start point P2S reaches or falls below a predetermined threshold, the processor 50 displays the advance notice bar R2 blinking at a certain cycle on the display 60. For example, the blinking cycle of the advance notice bar R2 becomes shorter as the vehicle V approaches the start point P2S, and the display of the advance notice bar R2 is stopped when the vehicle V enters the avoidance recommended section P2.

Note that the processor 50 may notify the driver of the start point or the end point of the information section by reproducing sounds from the speaker 80.

As described above, the lane display device according to the first modified example of the embodiment of the present invention notifies the driver that the vehicle V is approaching at least one of the start point and the end point of the information section, and can thereby notify the driver of the transition from or to the information section in advance without giving the feeling of strangeness. Moreover, the lane display device according to the first modified example of the embodiment of the present invention changes the degree of notification depending on the position of the vehicle V relative to the information section and can thereby notify the driver of approaching at least one of the start point and the end point of the section, with even less feeling of strangeness.

(Second Modified Example)

Figure 9:
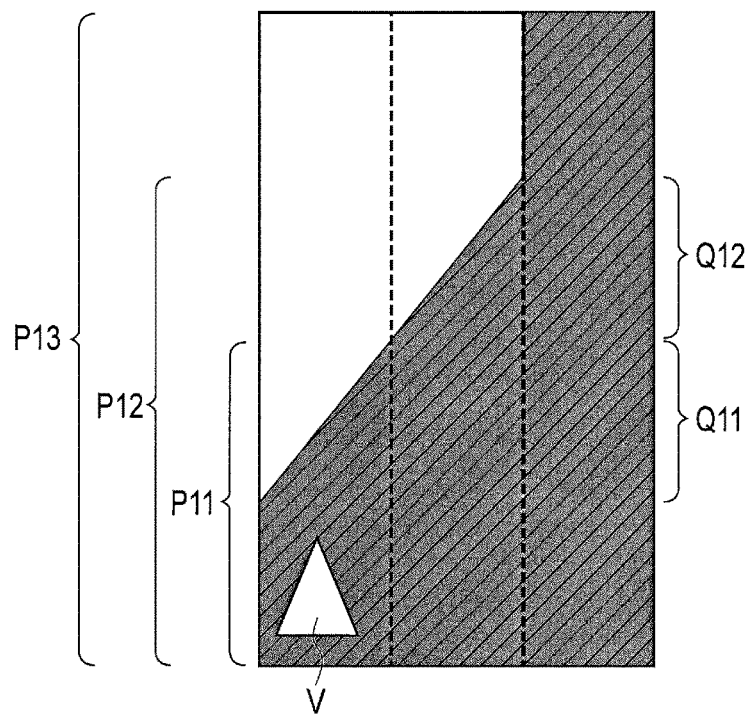
FIG. 9 is a view explaining an operation of a lane display device according to a second modified example of the embodiment of the present invention.

A lane display device according to a second modified example of the embodiment of the present invention is different from that of the aforementioned embodiment in that, as illustrated in FIG. 9, when the vehicle V travels on a road with multiple lanes, the lane display device displays transition regions Q11, Q12 to promote lane change to a lane in which the vehicle V is not traveling.

The example illustrated in FIG. 9 illustrates the case where the vehicle V is traveling in a left-end lane of a road with three lanes on one side and travel recommended sections P11, P12, P13 are set in this order from the left end. Since the travel recommended sections P11, P12 out of these sections will end soon, the vehicle V is recommended to perform lane change to a right-end lane. As illustrated in FIG. 9, transition regions Q11, Q12 set respectively near the end points of the travel recommended section P11, P12 have a pattern whose far end is tilted to the right side on which the target lane is present, while extending in the traveling direction of the vehicle V.

Figure 10:
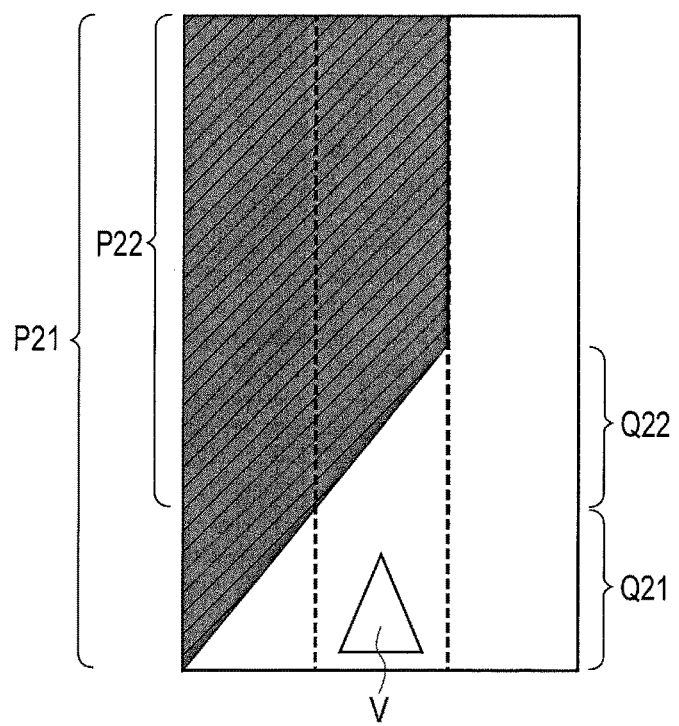
FIG. 10 is a view explaining an operation of the lane display device according to the second modified example of the embodiment of the present invention.

The example illustrated in FIG. 10 illustrates the case where the vehicle V is traveling in a center lane of a road with three lanes on one side and avoidance recommended sections P21, P22 are set respectively in a left-end lane and the center lane. Since the avoidance recommended sections P21, P22 will start soon, the vehicle V is recommended to perform lane change to the right-end lane. As illustrated in FIG. 10, transition regions Q21, Q22 set respectively near the start points of the avoidance recommended sections P21, P22 have a pattern whose near end is tilted to the right side on which the target lane is present, while extending in the traveling direction of the vehicle V.

As described above, when there is another lane to be a target, the lane display device according to the second modified example of the embodiment of the present invention displays the transition regions Q such that the transition regions Q heads toward the target lane. The lane display device according to the second modified example of the embodiment of the present invention can thereby notify the driver that the vehicle V is approaching at least one the start point and the end point of the section, without giving the feeling of strangeness and can also guide the vehicle V to the target lane.

(Other Embodiments)

Although the present invention has been described above by using the aforementioned embodiment, it should not be understood that the description and drawings forming part of this disclosure limit the present invention. From this disclosure, various alternative embodiments, examples, and operations techniques will be found by those skilled in the art.

For example, in the aforementioned embodiment, the lane of the vehicle V for which the information section and the like are displayed is not limited that in the route set by the route setter 52. The information acquirer 53 can acquire the traffic information on each of lanes in a road on which the vehicle V travels from the current position acquired by the position acquirer 51.

Moreover, the present invention includes various embodiments and the like which are not described herein such as configurations mutually adopting the aforementioned configurations, as a matter of course. Accordingly, the technical scope of the present invention should be determined only by the matters specifying the invention in the scope of claims regarded as appropriate based on the aforementioned description.

Furthermore, the functions described in the embodiment of the present invention can be executed by one or multiple processing circuits. The processing circuit includes a programed processing device such as a processing device including an electric circuit. The processing circuit may include devices such as circuit components and an application specific integrated circuit (ASIC) designed to execute the described functions.

The present invention can provide the lane display device and the lane display method which can reduce confusion of the driver by displaying the region indicating transition from or to the section of the lane.

REFERENCE SIGNS LIST 40 storage
41 map information
50 processor (notifying unit)
51 position acquirer
52 route setter
53 information acquirer
54 section setter
55 region setter
56 display processor
60 display

The invention claimed is:

1. A lane display method comprising:
   acquiring a current position of a vehicle in map information including lanes of each of roads;
   acquiring traffic information of a certain section for each of the lanes;
   displaying the certain section in the lane in which the vehicle travels, based on the traffic information and depending on a position of the vehicle;
   displaying a transition region with respect to the certain section on a region with a prescribed length along a direction of the lane from at least one of a start point or an end point of the certain section such that a pattern of the transition region changes more toward the at least one of the start point or the end point; and
   displaying the transition region on the region with the prescribed length along the direction of the lane from the start point of the certain section upon the certain section being a section recommended to be avoided.

2. The lane display method according to claim 1, further comprising displaying an advance notice bar blinking at a certain cycle on a position where the vehicle is approaching at least one of the start point and the end point of the certain section when the vehicle approaches the at least one of the start point and the end point.

3. The lane display method according to claim 1, further comprising displaying the transition region such that a far end of the pattern of the transition region is tilted to a side on which a target lane is present while extending in a traveling direction of the vehicle when the vehicle travels in a road having a plurality of lanes.

4. The lane display method according to claim 1, further comprising setting the certain section as a travel recommended section in which travel is recommended or an avoidance recommended section recommended to be avoided.

5. A lane display device comprising:
a storage configured to store map information including lanes in each of roads;
a position acquirer configured to acquire a current position of a vehicle in the map information;
an information acquirer configured to acquire traffic information of a certain section for each of the lanes; and
a display configured to display the certain section in the lane in which the vehicle travels, based on the traffic information and depending on a position of the vehicle,
wherein the display is configured to display a transition region with respect to the certain section on a region with a prescribed length along a direction of the lane from at least one of a start point or an end point of the certain section such that a pattern of the transition region changes more toward the at least one of the start point or the end point, and
the display displays the transition region on the region with the prescribed length along the direction of the lane from the start point of the certain section upon the certain section being a section recommended to be avoided.

6. The lane display device according to claim 1, further comprising a notifying unit configured to provide a notification that the vehicle is approaching at least one of the start point and the end point of the certain section when the vehicle approaches the at least one of the start point and the end point.

7. The lane display device according to claim 6, wherein the notifying unit changes a degree of the notification depending on a position of the vehicle relative to the certain section.

8. The lane display device according to claim 1, wherein the display is configured to display an advance notice bar blinking at a certain cycle on a position where the vehicle is approaching at least one of the start point and the end point of the certain section when the vehicle approaches the at least one of the start point and the end point.

9. The lane display device according to claim 1, wherein the display is configured to display the transition region such that a far end of the pattern of the transition region is tilted to a side on which a target lane is present while extending in a traveling direction of the vehicle when the vehicle travels in a road having a plurality of lanes.

10. The lane display device according to claim 1, further comprising a section setter configured to set the certain section as a travel recommended section in which travel is recommended or an avoidance recommended section recommended to be avoided.

11. A lane display device comprising:
a storage configured to store map information including lanes in each of roads;
a position acquirer configured to acquire a current position of a vehicle in the map information;
an information acquirer configured to acquire traffic information of a certain section for each of the lanes; and
a display configured to display the certain section in the lane in which the vehicle travels, based on the traffic information and depending on a position of the vehicle,
wherein the display is configured to display a transition region with respect to the certain section on a region with a prescribed length along a direction of the lane from at least one of a start point or an end point of the certain section such that a pattern of the transition region changes more toward the at least one of the start point or the end point, wherein the display displays the transition region on the region with the prescribed length along the direction of the lane from the end point of the certain section upon the certain section being a section in which travel is recommended.

* * * * *